United States Patent
Nakaoka et al.

(10) Patent No.: US 10,998,838 B2
(45) Date of Patent: May 4, 2021

(54) CONTROL APPARATUS AND CONTROL METHOD FOR ROTATING ELECTRICAL MACHINE

(71) Applicant: DENSO CORPORATION, Kariya (JP)

(72) Inventors: Takuro Nakaoka, Kariya (JP); Kiyoshi Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 305 days.

(21) Appl. No.: 16/317,230

(22) PCT Filed: Jul. 10, 2017

(86) PCT No.: PCT/JP2017/025086
§ 371 (c)(1),
(2) Date: Jan. 11, 2019

(87) PCT Pub. No.: WO2018/012447
PCT Pub. Date: Jan. 18, 2018

(65) Prior Publication Data
US 2019/0229667 A1 Jul. 25, 2019

(30) Foreign Application Priority Data

Jul. 12, 2016 (JP) .............................. JP2016-137648

(51) Int. Cl.
| | |
|---|---|
| *H02P 9/02* | (2006.01) |
| *H02P 21/34* | (2016.01) |
| *H02P 21/32* | (2016.01) |
| *H02P 21/22* | (2016.01) |
| *H02P 6/182* | (2016.01) |
| *H02P 25/22* | (2006.01) |

(52) U.S. Cl.
CPC .............. *H02P 21/34* (2016.02); *H02P 6/182* (2013.01); *H02P 21/22* (2016.02); *H02P 21/32* (2016.02); *H02P 25/22* (2013.01)

(58) Field of Classification Search
CPC .......... H02P 21/34; H02P 21/32; H02P 21/22; H02P 6/182; H02P 25/22
See application file for complete search history.

(56) References Cited

U.S. PATENT DOCUMENTS

| | | |
|---|---|---|
| 4,641,066 A | 2/1987 | Nagata et al. |
| 2004/0080291 A1 | 4/2004 | Inoue et al. |

(Continued)

FOREIGN PATENT DOCUMENTS

| | | |
|---|---|---|
| JP | H06-121586 A | 4/1994 |
| JP | 2004-028007 A | 1/2004 |

(Continued)

*Primary Examiner* — Muhammad S Islam
(74) *Attorney, Agent, or Firm* — Oliff PLC

(57) ABSTRACT

A rotor position judging unit detects a rotor position by utilizing induced voltages generated at respective phases of an armature winding. While a field current flowing through a field winding rises toward a target value (while the field current temporally changes), induced voltages are generated at the respective phases of the armature winding by temporal differentiation of a magnetic flux which interlinks with the armature winding. The rotor position judging unit detects the rotor position (d-axis of a rotor) on a basis of a table containing combination of amplitude ratios and polarities of the induced voltages generated at the respective phases.

7 Claims, 11 Drawing Sheets

(56) References Cited

U.S. PATENT DOCUMENTS

| | | | |
|---|---|---|---|
| 2011/0095714 A1 | 4/2011 | Kagawa | |
| 2011/0156664 A1* | 6/2011 | Horihata | H02P 9/48 322/24 |
| 2012/0086375 A1 | 4/2012 | Hirono | |
| 2014/0210426 A1* | 7/2014 | Terada | H02P 9/48 322/59 |

FOREIGN PATENT DOCUMENTS

| | | |
|---|---|---|
| JP | 2006-271038 A | 10/2006 |
| JP | 2007-195387 A | 8/2007 |
| JP | 2008-278736 A | 11/2008 |
| JP | 2011-106318 A | 6/2011 |
| JP | 2016-059152 A | 4/2016 |

\* cited by examiner

ROTOR POSITION (ELECTRICAL ANGLE)

FIG.5

| ROTOR POSITION | Vu AMPLITUDE RATIO | Vv AMPLITUDE RATIO | Vw AMPLITUDE RATIO |
|---|---|---|---|
| 0 | 0.000 | 0.866 | −0.866 |
| 10 | 0.174 | 0.766 | −0.940 |
| 20 | 0.342 | 0.643 | −0.985 |
| 30 | 0.500 | 0.500 | −1.000 |
| 40 | 0.643 | 0.342 | −0.985 |
| 50 | 0.766 | 0.174 | −0.940 |
| 60 | 0.866 | 0.000 | −0.866 |
| 70 | 0.940 | −0.174 | −0.766 |
| 80 | 0.985 | −0.342 | −0.643 |
| 90 | 1.000 | −0.500 | −0.500 |
| 100 | 0.985 | −0.643 | −0.342 |
| 110 | 0.940 | −0.766 | −0.174 |
| 120 | 0.866 | −0.866 | 0.000 |
| 130 | 0.766 | −0.940 | 0.174 |
| 140 | 0.643 | −0.985 | 0.342 |
| 150 | 0.500 | −1.000 | 0.500 |
| 160 | 0.342 | −0.985 | 0.643 |
| 170 | 0.174 | −0.940 | 0.766 |
| 180 | 0.000 | −0.866 | 0.866 |
| 190 | −0.174 | −0.766 | 0.940 |
| 200 | −0.342 | −0.643 | 0.985 |
| 210 | −0.500 | −0.500 | 1.000 |
| 220 | −0.643 | −0.342 | 0.985 |
| 230 | −0.766 | −0.174 | 0.940 |
| 240 | −0.866 | 0.000 | 0.866 |
| 250 | −0.940 | 0.174 | 0.766 |
| 260 | −0.985 | 0.342 | 0.643 |
| 270 | −1.000 | 0.500 | 0.500 |
| 280 | −0.985 | 0.643 | 0.342 |
| 290 | −0.940 | 0.766 | 0.174 |
| 300 | −0.866 | 0.866 | 0.000 |
| 310 | −0.766 | 0.940 | −0.174 |
| 320 | −0.643 | 0.985 | −0.342 |
| 330 | −0.500 | 1.000 | −0.500 |
| 340 | −0.342 | 0.985 | −0.643 |
| 350 | −0.174 | 0.940 | −0.766 |
| 360 | 0.000 | 0.866 | −0.866 |

FIG.8

| ROTOR POSITION | | Vu | Vv | Vw | Vu | Vv | Vw |
|---|---|---|---|---|---|---|---|
| | | \multicolumn{3}{c}{MAGNITUDE RELATIONSHIP} | | POLARITY | | |
| (1) | 0-30 | MEDIUM | LARGE | SMALL | + | + | — |
| (2) | 30-60 | LARGE | MEDIUM | SMALL | + | + | — |
| (3) | 60-90 | LARGE | MEDIUM | SMALL | + | — | — |
| (4) | 90-120 | LARGE | SMALL | MEDIUM | + | — | — |
| (5) | 120-150 | LARGE | SMALL | MEDIUM | + | — | + |
| (6) | 150-180 | MEDIUM | SMALL | LARGE | + | — | + |
| (7) | 180-210 | MEDIUM | SMALL | LARGE | — | — | + |
| (8) | 210-240 | SMALL | MEDIUM | LARGE | — | — | + |
| (9) | 240-270 | SMALL | MEDIUM | LARGE | — | + | + |
| (10) | 270-300 | SMALL | LARGE | MEDIUM | — | + | + |
| (11) | 300-330 | SMALL | LARGE | MEDIUM | — | + | — |
| (12) | 330-360 | MEDIUM | LARGE | SMALL | — | + | — |

CONTROL APPARATUS AND CONTROL METHOD FOR ROTATING ELECTRICAL MACHINE

CROSS-REFERENCE TO RELATED APPLICATION

This application is based on and claims the benefit of priority from earlier Japanese Patent Application No. 2016-137648 filed on Jul. 12, 2016, the description of which is incorporated herein by reference.

TECHNICAL FIELD

The present disclosure relates to a technique of controlling rotating electrical machine having a field winding and an armature winding.

BACKGROUND ART

Conventionally, idling stop is known which automatically stops an engine when a vehicle stops at an intersection, or the like.

After idling stop is implemented, even during speed reduced rotation until the engine is stopped, there is, for example, a case where a driver performs operation for starting the vehicle in reaction to change of a traffic light from red to green. In this case, the vehicle requires quick restart of the engine in response to operation for starting the vehicle by the driver. To address this requirement, for example, there is a case where the engine is restarted using a motor generator (which will be also referred to as an ISG) in which a motor function and a power generation function are integrated. A revolving field type synchronous motor generator is sometimes used as the motor generator mounted on a vehicle. The revolving field type synchronous motor generator includes a field winding as a rotor, and includes an armature winding as a stator.

However, when an engine is restarted using a synchronous motor generator, a field winding has large inductance. Therefore, a synchronous motor generator requires time to cause a field current to rise. That is, a time period from when a field current starts to be applied to a field winding until when the field current reaches a target value becomes long. As a result, it takes time to restart the engine.

In contrast to this, PTL 1 discloses the following technique. In the technique disclosed in PTL 1, after a time period during which a rate of rise of a field current is relatively high has elapsed since the field current started to be applied to a field winding, a d-axis component of an armature current is applied to an armature winding in a direction in which a field magnetic flux caused by the field current is cancelled out. According to this technique, it is possible to cancel out voltage drop due to the self-inductance component of the field winding with a mutual inductance component of the field winding and the armature winding. By this means, it is possible to cause the field current to rise early. As a result, it is possible to shorten a time period until when the field current reaches a target value, so that it is possible to restart the engine quickly.

CITATION LIST

Patent Literature

[PTL 1]: JP 2016-59152 A

SUMMARY OF THE INVENTION

Technical Problem

With the technique disclosed in PTL 1, a rotation angle sensor which detects an angular position of a rotor is required to specify a d-axis of the rotor (a central axis of the field winding). That is, with the technique disclosed in PTL 1, a rotation angle sensor is essential, and the technique cannot be performed without a rotation angle sensor.

The present disclosure provides a technique of controlling rotating electrical machine which is capable of detecting an angular position of a rotor without using a rotation angle sensor.

Solution to Problem

A control apparatus of rotating electrical machine which is one aspect of the technique of the present disclosure includes a rotor including a field winding and a stator including a polyphase armature winding. The control apparatus of the rotating electrical machine includes a field current control unit, a rotor position detecting unit and an armature current control unit. The field current control unit controls a field current applied to the field winding. The rotor position detecting unit detects an angular position of the rotor. The armature current control unit controls an armature current applied to the armature winding on the basis of the angular position of the rotor detected by the rotor position detecting unit. The rotor position detecting unit includes an induced voltage detecting unit and a rotor position judging unit. The induced voltage detecting unit detects induced voltages generated at respective phases of the armature winding while the field current applied to the field winding by the field current control unit rises toward a target value. The rotor position judging unit detects the angular position of the rotor on the basis of the induced voltages detected by the induced voltage detecting unit.

The rotor position detecting unit of the present disclosure can detect the angular position of the rotor even while the rotor is stopped. During a period while the field current flowing through the field winding rises toward the target value, induced voltages are generated at the respective phases of the armature winding by temporal differentiation of a magnetic flux which interlinks with the armature winding. Therefore, the rotor position detecting unit of the present disclosure detects the induced voltages using the induced voltage detecting unit, and detects the angular position of the rotor using the rotor position judging unit on the basis of the detected induced voltages. By this means, with the technique of the present disclosure, it is not necessary to use an expensive rotation angle sensor to detect an angular position of a rotor. It is therefore possible to reduce cost.

BRIEF DESCRIPTION OF DRAWINGS

FIG. 5 shows a table for detecting a rotor position according to the first embodiment.

FIG. 8 shows a table for detecting a rotor position according to the third embodiment.

DESCRIPTION OF EMBODIMENTS

Embodiments for implementing the technique of the present disclosure will be described in detail with reference to the drawings.

First Embodiment

In the present embodiment, a case where the technique of the present disclosure is applied to an engine starting apparatus will be described.

Figure 1:
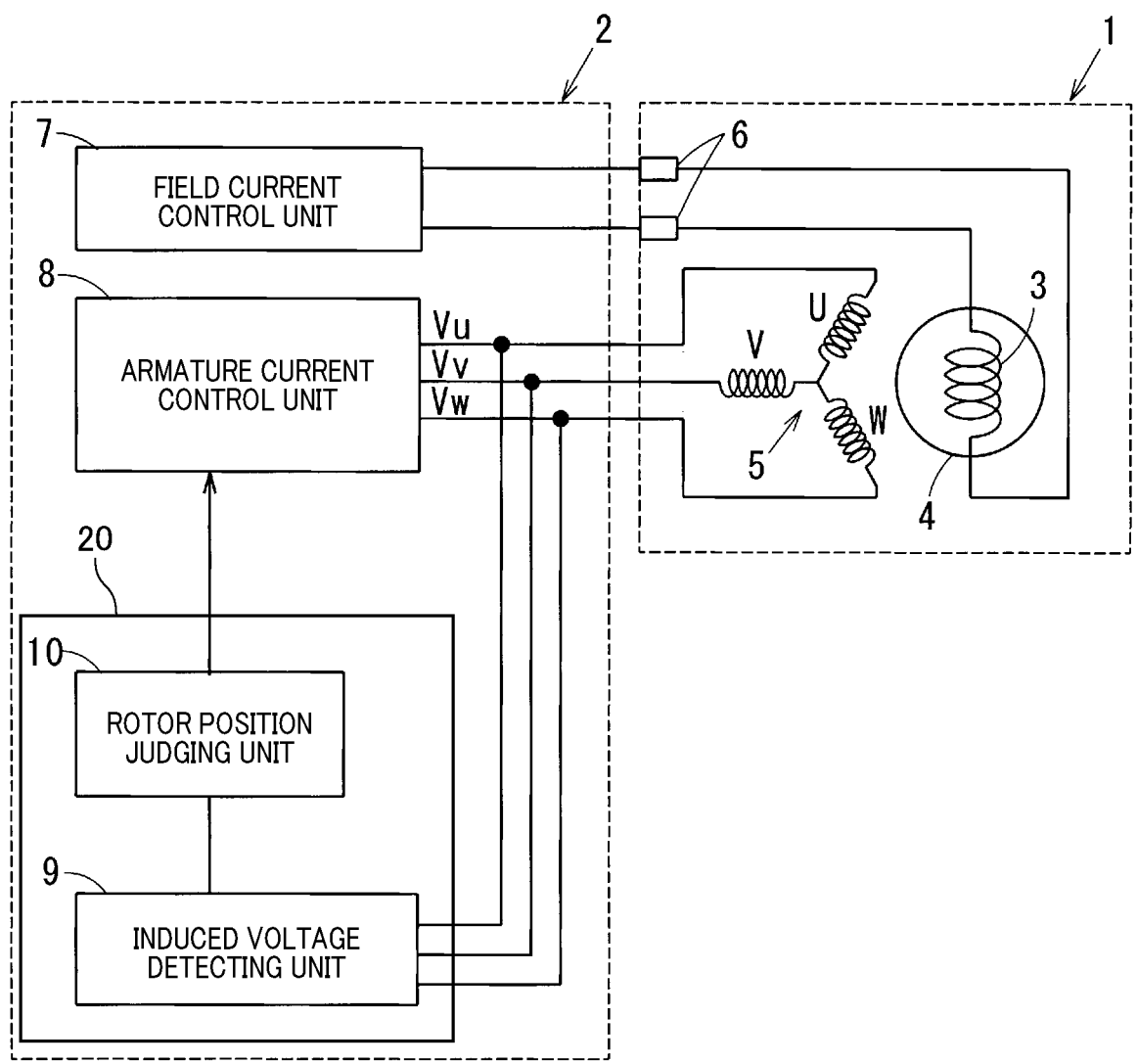
FIG. 1 is a block diagram of an engine starting apparatus according to a first embodiment.

As illustrated in FIG. 1, the engine starting apparatus includes a motor generator 1 corresponding to the rotating electrical machine of the present disclosure, and a control apparatus 2. In the motor generator 1, a motor function and a power generation function are integrated. The control apparatus 2 controls motor operation of the motor generator 1.

The motor generator 1 includes a rotor 4 including a field winding 3 and a stator including a three-phase armature winding 5. In the motor generator 1, the rotor 4 is connected to a crankshaft of an engine (not illustrated) via a belt, or the like. The field winding 3 is connected to a slip ring (not illustrated) attached to a rotor shaft. A field current is applied to the field winding 3 by a field current control unit 7 via a brush 6 which is in sliding contact with the slip ring. In the armature winding 5, for example, respective phases U, V and W which are star-connected are connected to an armature current control unit 8. The armature winding 5 generates a rotating field by a three-phase AC being applied by the armature current control unit 8.

The control apparatus 2 is configured to include a rotor position detecting unit 20 in addition to the above-described field current control unit 7 and armature current control unit 8. The rotor position detecting unit 20 detects an angular position of the rotor 4. Details of the rotor position detecting unit 20 will be described later.

The field current control unit 7, for example, adjusts a DC voltage to be applied to the field winding 3. By this means, the field current control unit 7 controls a field current flowing through the field winding 3 to be a predetermined target value. Hereinafter, a direction of a magnetic flux generated by a field pole of the rotor 4 is defined as a d-axis, and a direction electrically orthogonal to the d-axis is defined as a q-axis.

The armature current control unit 8 is an inverter which converts power of a DC power supply into AC power and feeds the AC power to the armature winding 5. The armature current control unit 8 divides an armature current into a current component relating to generation of torque and a current component relating to generation of a magnetic flux and independently controls the respective current components. In the present embodiment, the current component relating to generation of torque (the current component in a q-axis direction) will be referred to as a q-axis component. Further, the current component relating to generation of a magnetic flux (the current component in a d-axis direction) will be referred to as a d-axis component.

The rotor position detecting unit 20 includes an induced voltage detecting unit 9 and a rotor position judging unit 10 which will be described below. The induced voltage detecting unit 9 detects induced voltages Vu, Vv and Vw generated at the respective phases U, V and W of the armature winding 5 by temporal differentiation of a magnetic flux which interlinks with the armature winding 5 when the field current flowing through the field winding 3 rises toward the target value. That is, when the field current temporally changes, the induced voltage detecting unit 9 detects the induced voltages Vu, Vv and Vw generated at the respective phases U, V and W of the armature winding 5 by temporal differentiation of the magnetic flux which interlinks with the armature winding 5.

The rotor position judging unit 10 detects an angular position of the rotor 4 on the basis of the induced voltages Vu, Vv and Vw of the respective phases U, V and W detected by the induced voltage detecting unit 9. Hereinafter, the angular position of the rotor 4 will be referred to as a rotor position. A specific method for detecting the rotor position will be described later.

Figure 2:
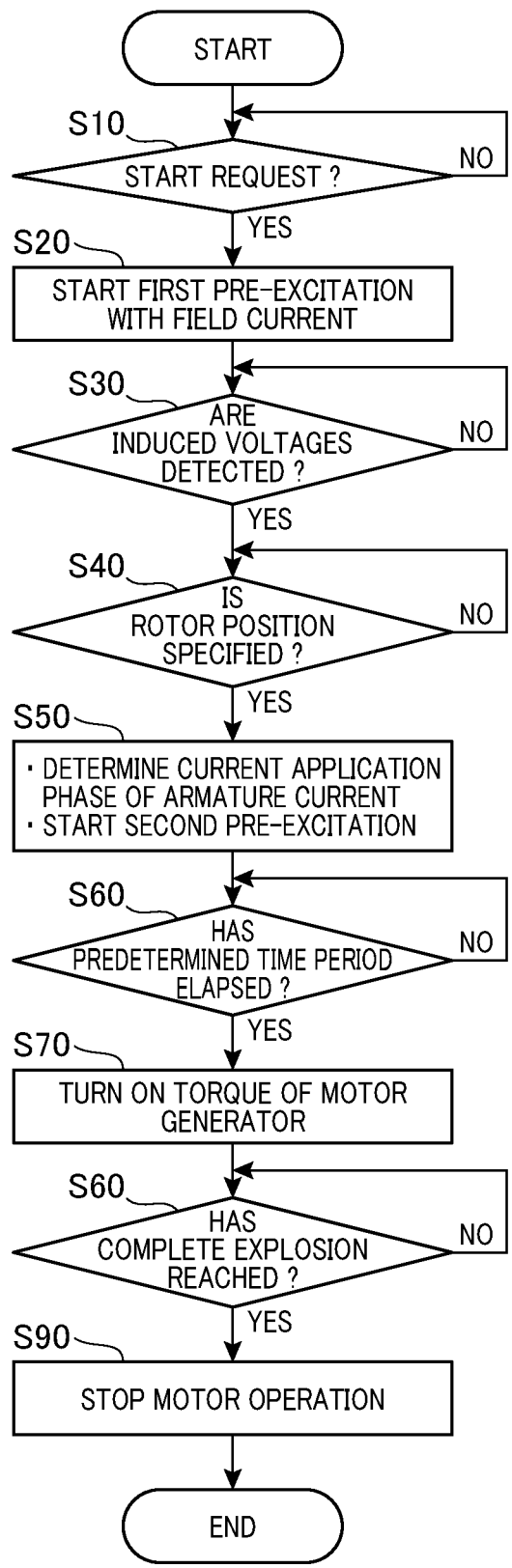
FIG. 2 is a flowchart illustrating processing procedure of a control apparatus according to the first embodiment.
Figure 3:
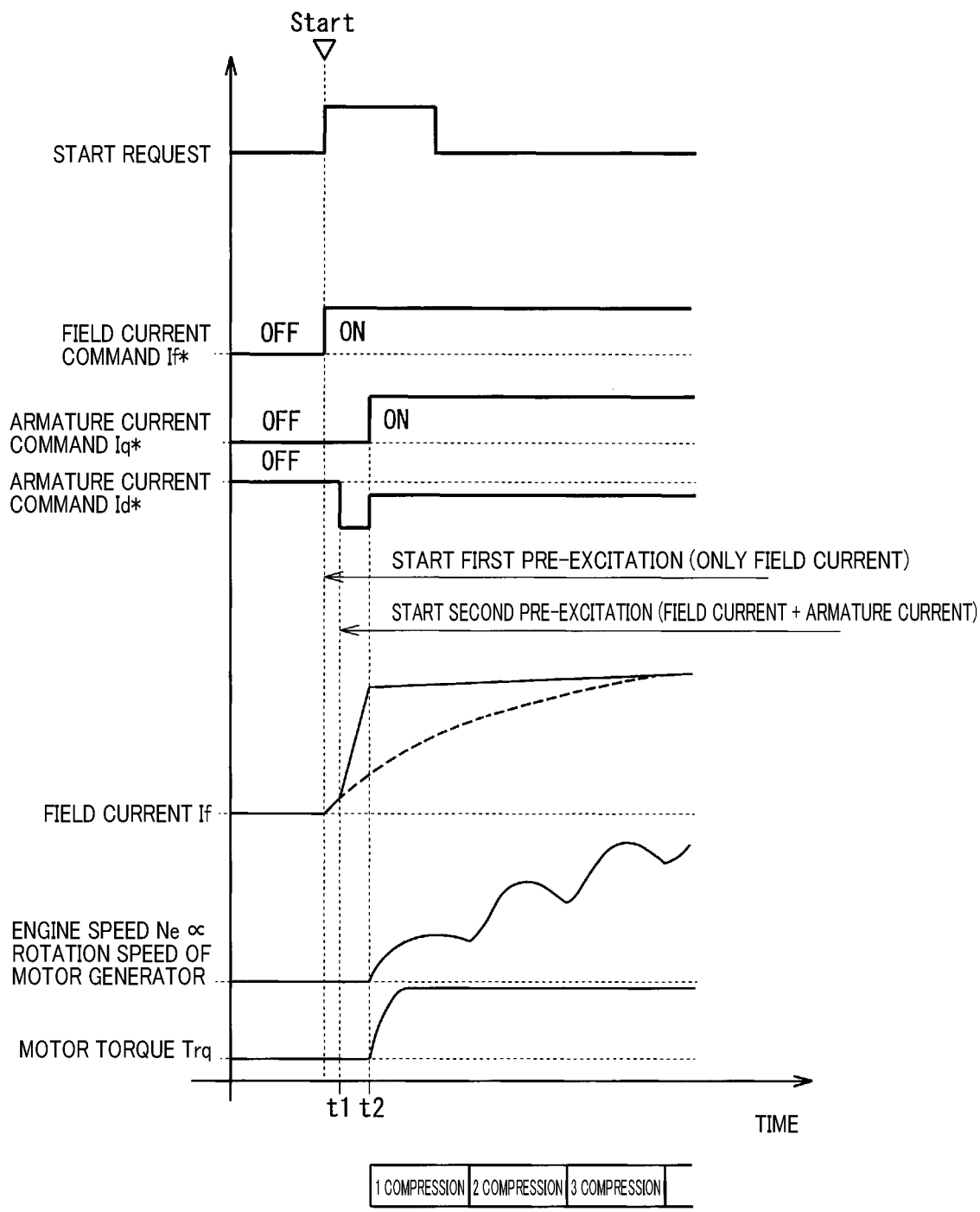
FIG. 3 is a time chart in which control operation according to the first embodiment is indicated on a time axis.

Procedure of controlling motor operation of the motor generator 1 by the control apparatus 2 in the present embodiment will be described on the basis of a flowchart in FIG. 2 and a time chart in FIG. 3. Note that the following steps S10 to S90 correspond to S10 to S90 respectively assigned to processing in the flowchart illustrated in FIG. 2.

The control apparatus 2 determines whether an engine start request (see FIG. 3) is input (step S10). The engine start request is output by an engine ECU (not illustrated) which controls an operation state of an engine, for example, in the following cases. Specifically, the engine start request is output when a driver performs an operation for starting a vehicle after idling stop is executed and the engine is stopped. Note that the operation for starting a vehicle by the driver is, for example, releasing a brake pedal, shifting from an N range to a D range, or the like. The control apparatus 2 repeats the determination processing in step S10 (step S10: No) until the engine start request is input. In the case where the engine start request is input (step S10: Yes), processing proceeds to step S20.

The control apparatus 2 performs control so that the field current control unit 7 starts first pre-excitation on the field winding 3 on the basis of a field current command IF* (step S20). Note that "*" means a command value.

The control apparatus 2 determines whether induced voltages generated at the respective phases of the armature winding 5 have been detected by the induced voltage detecting unit 9 (step S30). The control apparatus 2 repeats the determination processing in step S30 (step S30: No) until induced voltages have been detected. In the case where induced voltages are detected (step S30: Yes), processing proceeds to step S40.

The control apparatus 2 determines whether the rotor position has been detected by the rotor position judging unit 10 (step S40). The control apparatus 2 repeats the determination processing in step S40 (step S40: No) until a rotor position has been detected. In the case where a rotor position is detected (step S40: Yes), processing proceeds to step S50.

Here, a specific method for detecting a rotor position in the present embodiment will be described on the basis of a waveform diagram in FIG. 4 and a table in FIG. 5.

Figure 4:
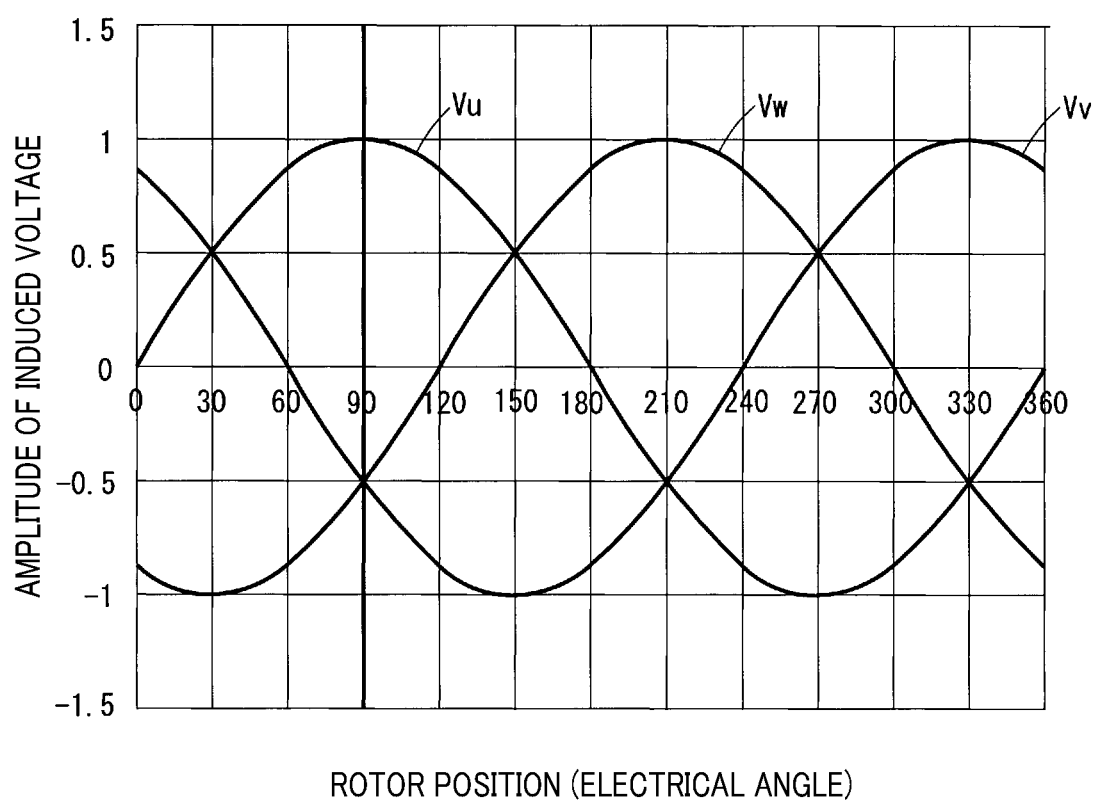
FIG. 4 is a waveform diagram of induced voltages of respective phases according to the first embodiment.

As illustrated in FIG. 4 and FIG. 5, the rotor position judging unit 10 detects a rotor position from combination of amplitude ratios and polarities of induced voltages Vu, Vv and Vw generated at the respective phases U, V and W of the armature wiring 5.

For example, as illustrated in FIG. 4, the polarities of the induced voltages are judged using a zero crossing line at which an amplitude of the induced voltage is zero as a threshold. In the present embodiment, a lower side of the threshold (zero crossing line) is regarded as negative. The amplitude ratios of the induced voltages are calculated every 10 degrees of an electrical angle assuming that a maximum value of the amplitude is 1.000 and a minimum value is −1.000.

FIG. 5 illustrates a table which records the amplitude ratios (including the polarities) of the induced voltages Vu, Vv and Vw generated at the respective phases U, V and W, corresponding to rotor positions of every 10 degrees of an electrical angle. The rotor position judging unit 10 detects a rotor position with reference to this table. As an example, in the case where the amplitude ratio of the induced voltage Vu of the U phase is 1.000, the amplitude ratio of the induced voltage Vv of the V phase is −0.500, and the amplitude ratio of the induced voltage Vw of the W phase is −0.500, it can be detected that the rotor position is 90 degrees.

The control apparatus 2 determines a current application phase of the armature current on the basis of the rotor position detected by the rotor position judging unit 10. The armature current control unit 8 then starts second pre-excitation on the armature winding 5 on the basis of an armature current command Id* (step S50). The second pre-excitation is performed by a d-axis component of the armature current being applied in a direction in which a field magnetic flux generated by the first pre-excitation started in step S20 is cancelled out. A timing at which the second pre-excitation is started is an initial time point (time t1 illustrated in FIG. 3) at which a rate of rise of the field current is relatively high from when the field current has started to flow through the field winding 3 due to the first pre-excitation.

The control apparatus 2 determines whether a predetermined time period has elapsed since the second pre-excitation was started (step S60). The control apparatus 2 repeats the determination processing in step S60 (step S60: No) until the predetermined time period has elapsed. In the case where the predetermined time period has elapsed (step S60: Yes), processing proceeds to step S70.

The control apparatus 2 turns ON torque of the motor generator 1 (step S70). Specifically, the control apparatus 2 performs control so that the armature current control unit 8 applies a q-axis component of the armature current to the armature winding 5 on the basis of an armature current command Iq* at a timing (time t2 illustrated in FIG. 3) at which the predetermined time period has elapsed from time t1 illustrated in FIG. 3.

The control apparatus 2 determines whether the engine has reached complete explosion (step S80). For example, in the case where engine speed Ne illustrated in FIG. 3 exceeds a stable ignition rotation speed set in advance, it can be determined that the engine has reached complete explosion. The determination processing in step S80 is repeated (step S80: No) until the engine has reached complete explosion. In the case where it is determined that the engine has reached complete explosion (step S80: Yes), processing proceeds to step S90.

The control apparatus 2 stops motor operation of the motor generator 1 (step S90). However, the motor generator 1 is connected to the crankshaft of the engine via a belt. Therefore, after the motor operation is stopped, the motor generator 4 functions as a power generator by being driven by the engine.

[Operation and Effects of First Embodiment]

The control apparatus 2 of the present embodiment applied to the engine starting apparatus starts the second pre-excitation on the armature winding 5 at a predetermined timing (time t2) after the first pre-excitation is started. That is, in the present embodiment, after a time period (a predetermined time period from time t1 to t2) during which a rate of rise of the field current is relatively high has elapsed since the field current started to be applied to the field winding 3, a d-axis component of the armature current is applied to the armature winding 5 in a direction in which a field magnetic flux generated by the field current is cancelled out. According to this technique, the control apparatus 2 of the present embodiment can cancel out voltage drop by a self-inductance component of the field winding 3 with a mutual inductance component of the field winding 3 and the armature winding 5. By this means, as illustrated in FIG. 3, the field current If rises earlier than in the case where the second pre-excitation is not performed (a broken line graph in FIG. 3). It is therefore possible to shorten a time period until when the field current If reaches the target value. As a result, it is possible to cause motor torque Trq of the motor generator 1 to quickly rise in response to an engine start request. It is therefore possible to restart the engine in a short period of time.

Further, the rotor position judging unit 10 detects a rotor position by utilizing induced voltages generated at the respective phases of the armature winding 5. While the field current flowing through the field winding 3 rises toward the target value, induced voltages are generated at the respective phases of the armature winding 5 by temporal differentiation of a magnetic flux which interlinks with the armature winding 5. In other words, while the field current temporally changes, induced voltages are generated at the respective phases of the armature winding 5 by temporal differentiation of the magnetic flux which interlinks with the armature winding 5. The rotor position judging unit 10 detects a rotor position (d-axis) every 10 degrees of an electrical angle on the basis of the table (see FIG. 5) containing combination of polarities and amplitude ratios of the induced voltages generated at the respective phases. Note that accuracy of the electrical angle for detecting the rotor position can be further improved by segmenting resolution of the table. According to this detecting method, in the present embodiment, it is not necessary to prepare map data in which a correspondence relationship between rotation speed of the rotor 4 and an amplitude of the induced voltage is recorded for each rotation speed. It is therefore possible to reduce the storage capacity of a storage device (for example, a memory) provided at the control apparatus 2. Further, in the present embodiment, even while the rotor 4 is stopped, it is possible to detect the rotor position. Therefore, it is not necessary to use an expensive rotation angle sensor (for example, a resolver) for detecting the rotor position. It is therefore possible to reduce cost.

Other embodiments which are embodiments of the technique of the present disclosure will be described below with reference to the drawings.

Note that reference numerals which are the same as those in the first embodiment are assigned to portions indicating parts and components in common with those in the above-described first embodiment, and detailed description will be omitted (description of the first embodiment is referred to).

Second Embodiment

The present embodiment is a case which assumes that the field current If is not zero [ampere] at a time point at which an engine start request occurs.

Figure 6:
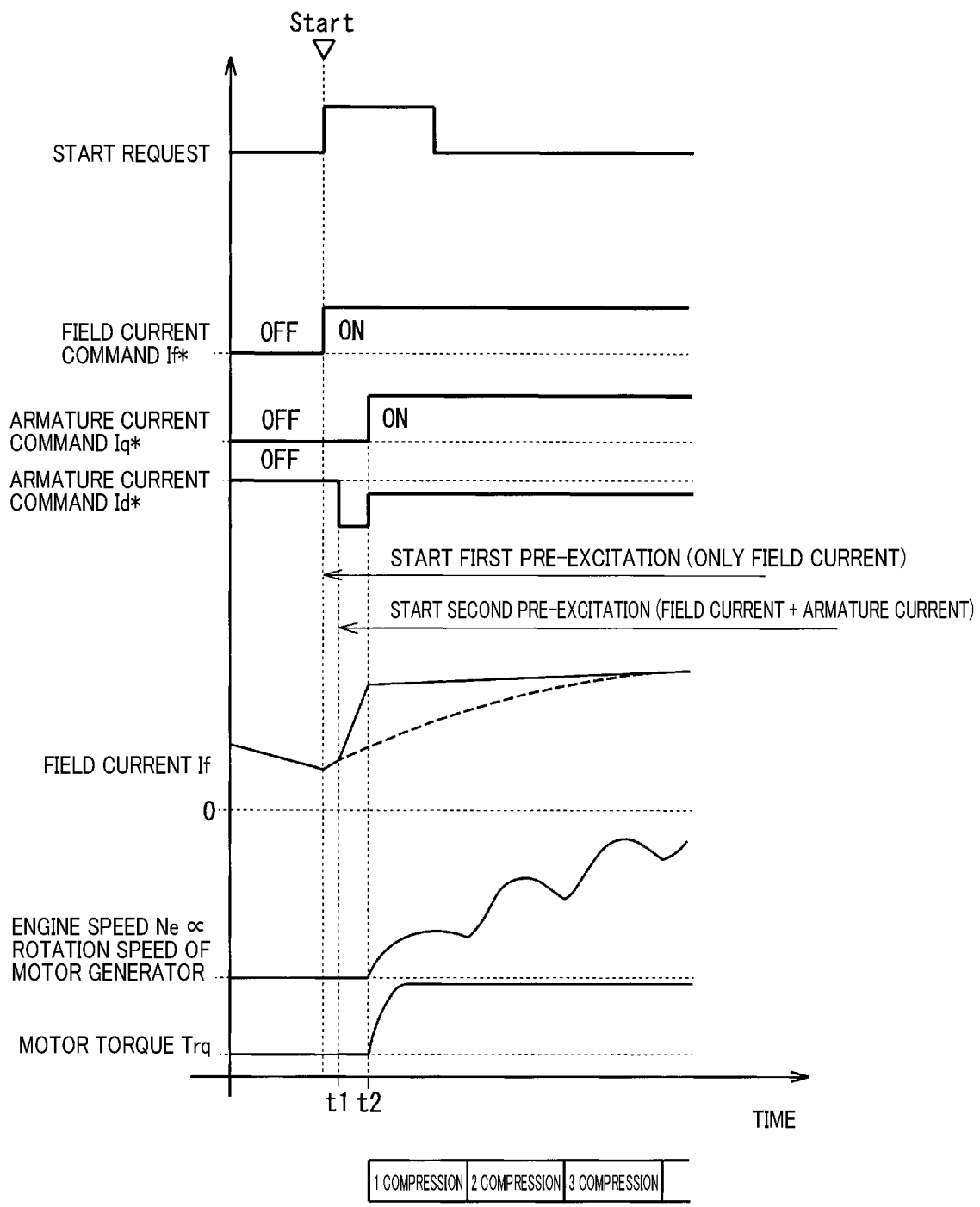
FIG. 6 is a flowchart illustrating processing procedure of a control apparatus according to a second embodiment.

For example, in the following scenes, it is assumed that the field current If is not zero [ampere] at a time point at which an engine start request occurs, as illustrated in FIG. 6. Specifically, the scenes include a case where a driver performs operation for starting a vehicle during speed reduced rotation of the engine, or a case where operation shifts from power generation to engine starting. Also in such a case, the control apparatus 2 of the present embodiment performs control similar to that in the first embodiment (performs control illustrated in the flowchart in FIG. 2) in response to occurrence of the start request. By this means, in the present embodiment, it is possible to provide operational effects similar to those in the first embodiment. Note that a timing at which the second pre-excitation is started on the basis of the armature current command Id* is immediately after (time t1 in FIG. 6) the field current If which has been on a decreasing trend until then starts to increase due to the first pre-excitation being started on the field winding 3.

Third Embodiment

The present embodiment is a case in which the method for detecting a rotor position by the rotor position judging unit 10 is different from that in the first embodiment.

Figure 7:
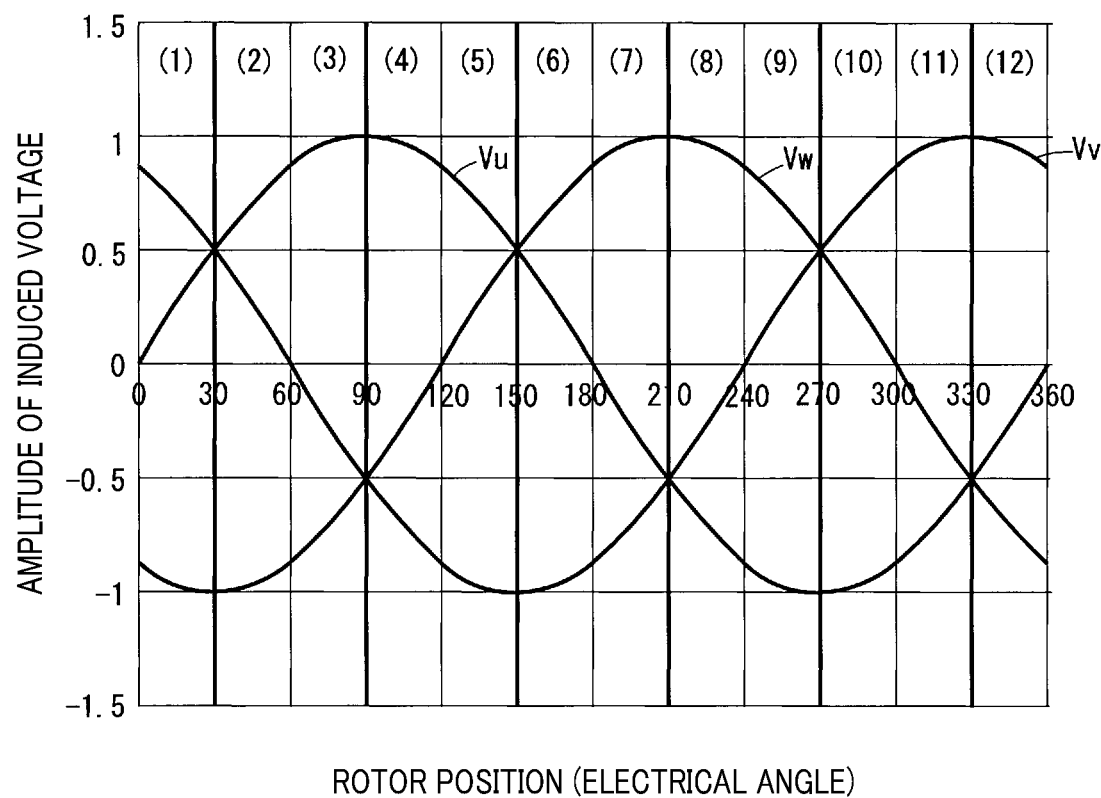
FIG. 7 is a waveform diagram of induced voltages of respective phases according to a third embodiment.

As illustrated in FIG. 7 and FIG. 8, the rotor position judging unit 10 of the present embodiment detects a rotor position from combination of magnitude relationship and the polarities of the induced voltages Vu, Vv and Vw generated at the respective phases U, V and W of the armature winding 5.

The polarities of the induced voltages are judged using a zero crossing line at which an amplitude is zero as a threshold in a similar manner to the first embodiment. The magnitude relationship of the induced voltages is judged by a distance from the threshold regardless of the polarities. FIG. 8 illustrates a table in which the magnitude relationship and the polarities of the induced voltages Vu, Vv and Vw generated at the respective phases U, V and W are recorded. The rotor position judging unit 10 detects a rotor position with reference to this table.

As an example, in the case where the magnitude relationship of Vu, Vv and Vw is "large", "medium" and "small", and the polarities are "+", "−" and "−" respectively, it can be detected that the rotor position is within a range (4) between 90 and 120 degrees. Note that ranges (1) to (12) indicated in the table in FIG. 8 correspond to ranges (1) to (12) indicated in FIG. 7 (a waveform diagram of the induced voltages).

In the present embodiment, it is possible to detect a rotor position by utilizing the magnitude relationship and the polarities of the induced voltages generated at the respective phases of the armature winding 5. By this means, in the present embodiment, it is possible to configure the rotor position judging unit 10 with a simple circuit such as a comparator. Further, in the present embodiment, it is not necessary to use a rotation angle sensor for detecting a rotor position as in the first embodiment. It is therefore possible to reduce cost.

Fourth Embodiment

The present embodiment is a case in which a phase of the armature current is advanced or delayed in a direction in which an induced voltage of a phase indicating a medium magnitude (hereinafter, referred to as an "intermediate phase") among the magnitude relationship of the induced voltages described in the third embodiment becomes zero.

Figure 9:
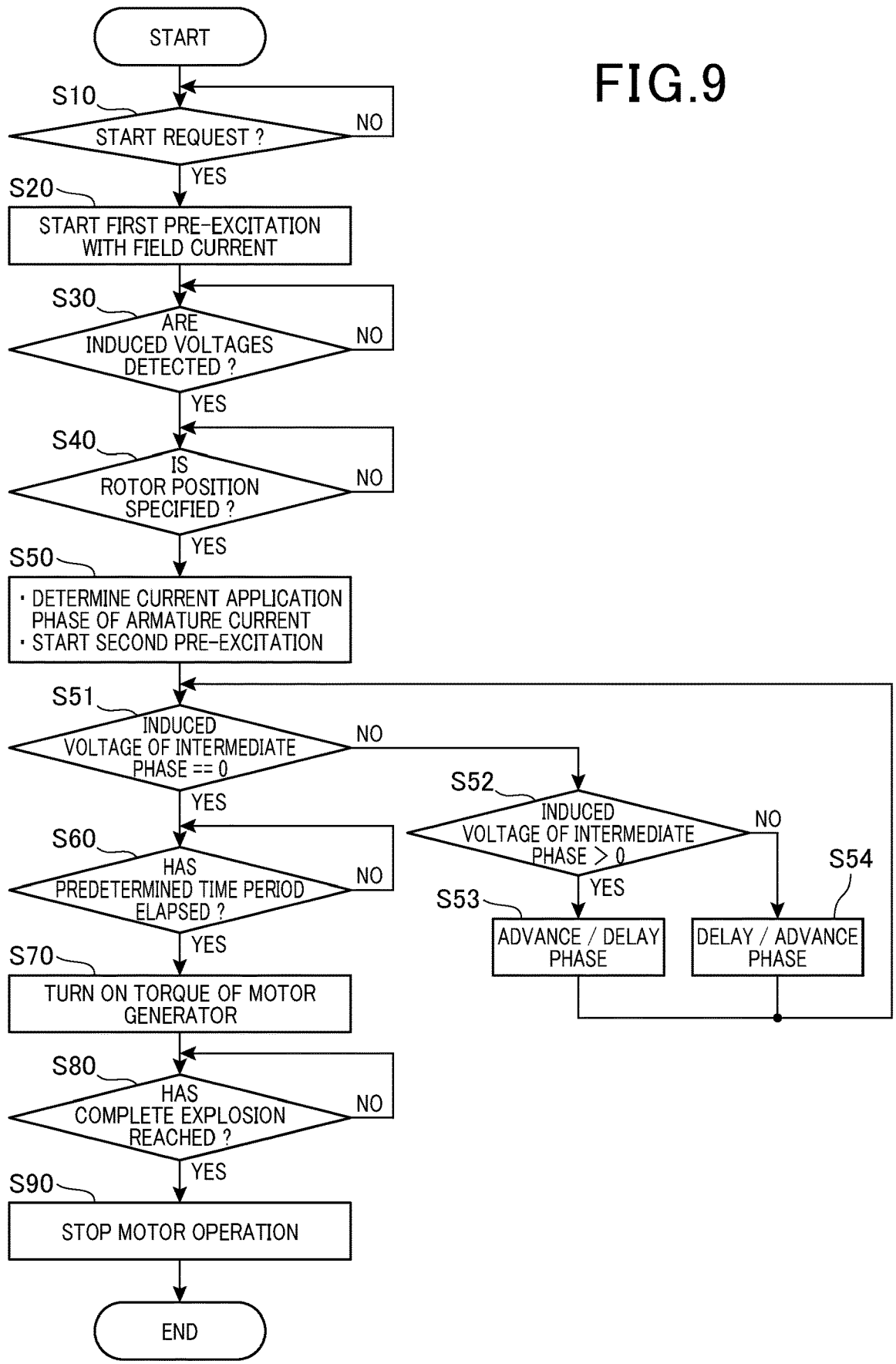
FIG. 9 is a flowchart illustrating processing procedure of a control apparatus according to a fourth embodiment.

In the present embodiment, the procedure of controlling motor operation of the motor generator 1 by the control apparatus 2 will be described on the basis of a flowchart in FIG. 9. Note that, in the flowchart in FIG. 9, processing from step S51 to S54 is control in the case where the phase of the armature current is advanced or delayed. Other processing is the same as the processing described in the first embodiment with reference to the flowchart in FIG. 2. Therefore, description will be omitted.

The control apparatus 2 determines whether the induced voltage of the intermediate phase is zero (step S51). In the case where the induced voltage is zero (step S51: Yes), processing of the control apparatus 2 proceeds to processing in step S60. In subsequent control, processing similar to that in the first embodiment is performed. In the case where the induced voltage of the intermediate phase is nonzero (step S51: No), processing proceeds to step S52.

The control apparatus 2 determines whether the induced voltage of the intermediate phase is greater than zero (step S52). In the case where the induced voltage of the intermediate phase is greater than zero (step S52: Yes), processing proceeds to step S53. The control apparatus 2 advances or delays the phase of the armature current in a direction in which the induced voltage of the intermediate phase becomes zero (step S53). For example, in a range (2) in which the rotor position is between 30 and 60 degrees illustrated in FIG. 7, the induced voltage Vv of the intermediate phase (V phase) is greater than zero. In this case, the control apparatus 2 advances the armature current in a direction in which the dielectric voltage Vv becomes zero (in a direction of 60 degrees). Further, in a range (5) in which the rotor position is between 120 and 150 degrees, the induced voltage Vw of the intermediate phase (W phase) is greater than zero. In this case, the control apparatus 2 delays the armature current in a direction in which the induced voltage Vw becomes zero (in a direction of 120 degrees).

On the other hand, in the case where the induced voltage of the intermediate phase is smaller than zero (step S52: No), processing proceeds to step S54. The control apparatus 2 delays or advances the phase of the armature current in a direction in which the induced voltage of the intermediate phase becomes zero (step S54). For example, in a range (3) in which the rotor position is between 60 and 90 degrees illustrated in FIG. 7, the induced voltage Vv of the intermediate phase (V phase) is smaller than zero. In this case, the control apparatus 2 delays the armature current in a direction in which the induced voltage Vv becomes zero (in a direction of 60 degrees). Further, in a range (4) in which the rotor position is between 90 and 120 degrees, the induced voltage Vw of the intermediate phase (W phase) is smaller than zero. In this case, the control apparatus 2 advances the armature current in a direction in which the induced voltage Vw becomes zero (in a direction of 120 degrees).

The control apparatus 2 repeatedly executes the processing from step S51 to S54 (step S51: No) until it is determined that the induced voltage of the intermediate phase is zero. As described above, in the present embodiment, the phase of the armature current is advanced or delayed in a direction in which the induced voltage of the intermediate phase becomes zero. By this means, in the present embodiment, it is possible to correct the rotor position to a more accurate value.

Fifth Embodiment

The present embodiment is a case in which the stator includes the armature winding 5 having six or more phases.

Figure 10:
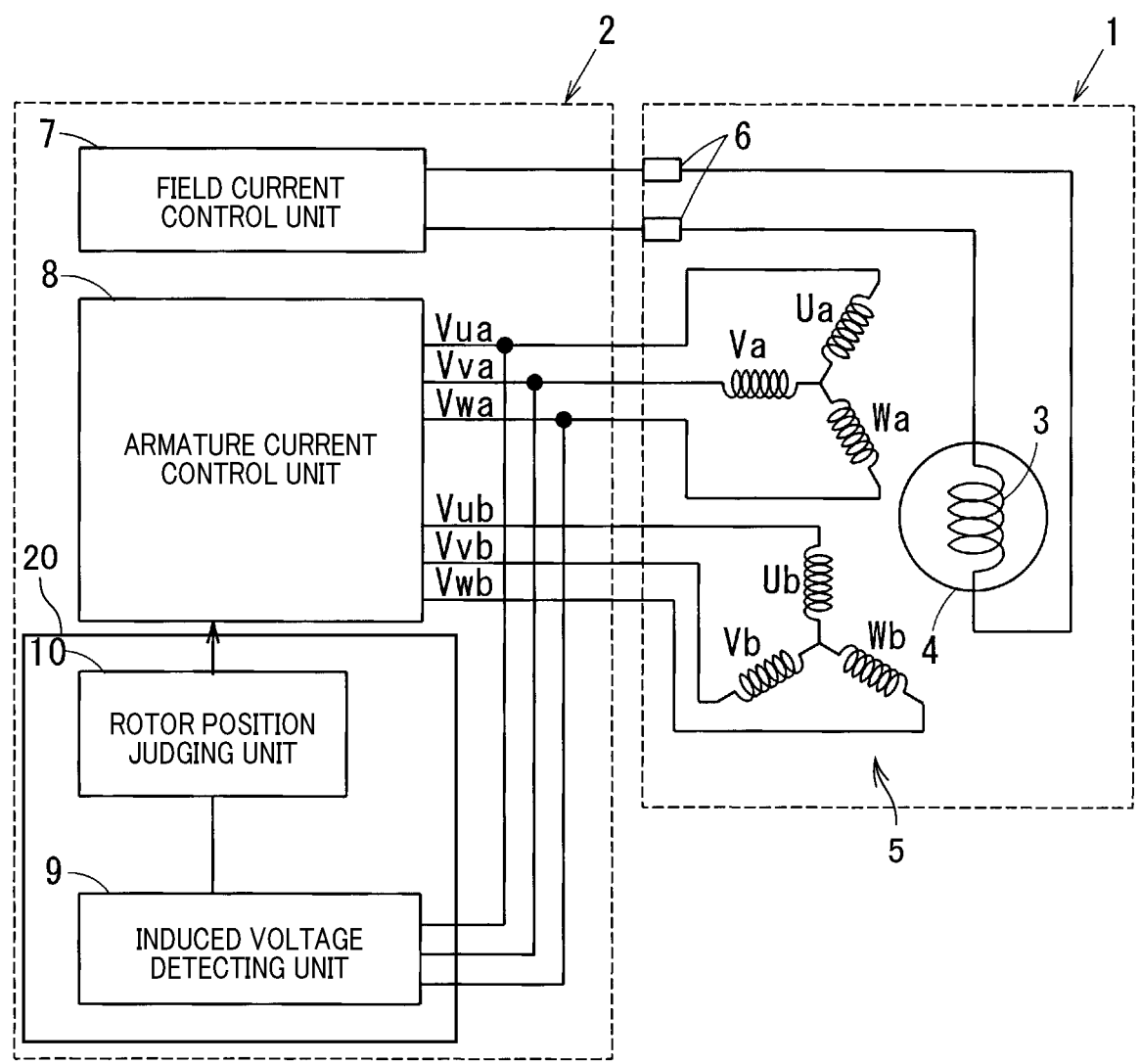
FIG. 10 is a block diagram of an engine starting apparatus according to a fifth embodiment.

As illustrated in FIG. 10, the armature winding 5 of the present embodiment, for example, includes first three-phase coils Ua, Va and Wa and second three-phase coils Ub, Vb and Wb, having a phase difference of 30 degrees of an electrical angle.

In the present embodiment, in a similar manner to the first embodiment, when the first pre-excitation is started at the field winding 3, induced voltages are generated at the first three-phase coils and the second three-phase coils.

Figure 11:
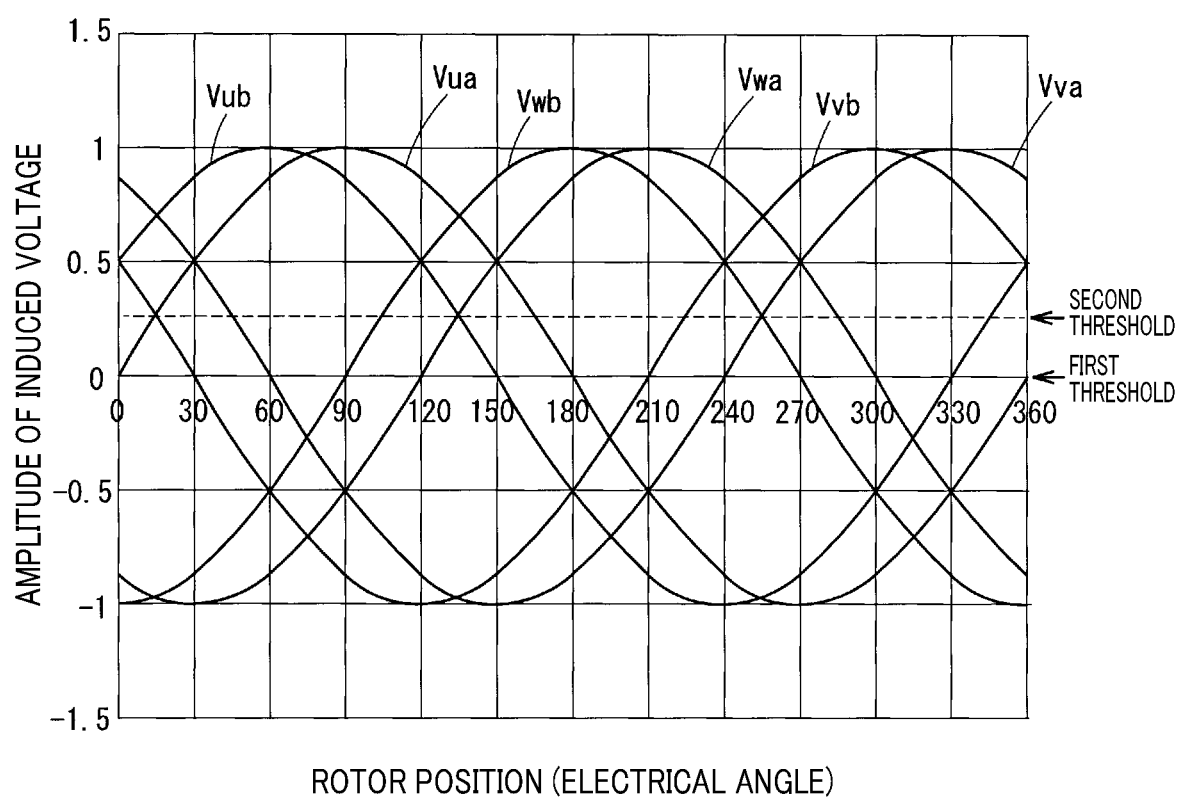
FIG. 11 is a waveform diagram of induced voltages of respective phases according to the fifth embodiment.

In the present embodiment, as illustrated in FIG. 11, phase differences of 30 degrees of an electrical angle occur between the induced voltages Vua, Vva and Vwa generated at the first three-phase coils Ua, Va and Wa and the induced voltages Vub, Vvb and Vwb generated at the second three-phase coils Ub, Vb and Wb.

The rotor position judging unit 10 of the present embodiment detects the rotor position by utilizing shift of phases between the induced voltages generated at the first three-phase coils and the induced voltages generated at the second three-phase coils. Specifically, the rotor position judging unit 10 judges magnitude relationship and polarities of the induced voltages generated at the respective phases using two different thresholds. Note that, in the present embodiment, the two thresholds are set as follows. Specifically, as illustrated in FIG. 11, a first threshold is set on a line at which an amplitude of the induced voltage is zero. Further, a second threshold is set at a position where the induced voltages generated at the first three-phase coils intersect with the induced voltages generated at the second three-phase coils (in FIG. 11, a position where Vua intersects with Vvb). The rotor position judging unit 10 judges the magnitude relationship and the polarities of the induced voltages on the basis of the first and the second thresholds set in this manner. According to this configuration, in the present embodiment, it is possible to detect the rotor position every 15 degrees of an electrical angle using the detecting method similar to that in the third embodiment.

Modified Examples

In the first embodiment, the rotor position (d-axis) is detected to perform the second pre-excitation on the armature winding 5. However, even in the case where the second pre-excitation is not performed, it is possible to apply a technique of detecting a rotor position of the present disclosure. The technique of detecting a rotor position in the present disclosure is as follows. First, while the field current rises toward the target value, the induced voltages generated at the respective phases of the armature winding 5 are detected. Then, a rotor position is detected on the basis of the detected induced voltages. That is, the detecting technique of the present disclosure does not necessarily assume that the second pre-excitation is performed on the armature winding 5.

The fifth embodiment is a case in which the armature winding 5 includes two sets of three-phase coils. However, the present disclosure can be applied to a case in which the armature winding 5 includes three or more sets of three-phase coils having phases different from one another. In this case, three or more thresholds for judging the magnitude relationship and the polarities of the induced voltages generated at the respective phases can be set at the control apparatus 2.

REFERENCE SIGNS LIST

1 . . . Motor generator (rotating electrical machine)
2 . . . Control apparatus
3 . . . Field winding
4 . . . Rotor
5 . . . Armature winding
7 . . . Field current control unit
8 . . . Armature current control unit
9 . . . Induced voltage detecting unit
10 . . . Rotor position judging unit
20 . . . Rotor position detecting unit

The invention claimed is:

1. A control apparatus of rotating electrical machine including
a rotor including a field winding and a stator including a polyphase armature, winding, the control apparatus comprising:
a field current control unit configured to control a field current applied to the field winding;
a rotor position detecting unit configured to detect an angular position of the rotor; and
an armature current control unit configured to control an armature current applied to the armature winding on a basis of the angular position of the rotor detected by the rotor position detecting unit,
wherein the rotor position detecting unit comprises:
an induced voltage detecting unit configured to detect induced voltages generated at respective phases of the armature winding while the field current applied to the field winding by the field current control unit rises toward a target value; and
a rotor position judging unit configured to detect the angular position of the rotor on a basis of the induced voltages detected by the induced voltage detecting unit.

2. The control apparatus of rotating electrical machine according to claim 1,
wherein the rotor position judging unit detects the angular position of the rotor on a basis of amplitude ratios and polarities of the induced voltages generated at the respective phases of the armature winding.

3. The control apparatus of rotating electrical machine according to claim 1,
wherein the rotor position judging unit detects the angular position of the rotor on a basis of magnitude relationship and polarities of the induced voltages generated at the respective phases of the armature winding.

4. The control apparatus of rotating electrical machine according to claim 3,
wherein the armature winding has six or more phases, and the rotor position judging unit has two or more thresholds for judging the magnitude relationship and the polarities of the induced voltages generated at the respective phases of the armature winding.

5. The control apparatus of rotating electrical machine according to claim 3,
wherein the armature current control unit advances or delays a phase of the armature current in a direction reducing an induced voltage of an intermediate phase among the magnitude relationship of the induced voltages generated at the respective phases of the armature winding.

6. The control apparatus of rotating electrical machine according to claim 1,
wherein, when a direction of a magnetic flux generated by a field pole of the rotor is defined as a d-axis, and a direction electrically orthogonal to the d-axis is defined as a q-axis,
the armature current control unit divides the armature current to be applied to the armature winding into a current component in a direction of the d-axis and a current component in a direction of the q-axis, and applies the current component in the direction of the d-axis to the armature winding in a direction in which a field magnetic flux generated by the field current is cancelled out while the field current to be applied to the field winding by the field current control unit rises toward the target value.

7. A control method of rotating electrical machine including a rotor including a field winding and a stator including a polyphase armature winding, the control method comprising:

a field current control step of controlling a field current applied to the field winding;

a rotor position detection step of detecting an angular position of the rotor; and an armature current control step of controlling an armature current applied to the armature winding on a basis of the detected angular position of the rotor, wherein the rotor position detection step comprising:

an induced voltage detection step of detecting induced voltages generated at respective phases of the armature winding while the field current applied to the field winding by the field current control step rises toward a target value; and a rotor position judging step of detecting the angular position of the rotor on a basis of the detected induced voltages.

* * * * *